United States Patent
Hegde et al.

(10) Patent No.: US 12,487,999 B2
(45) Date of Patent: *Dec. 2, 2025

(54) SYSTEM, METHOD, AND COMPUTER PROGRAM PRODUCT FOR ACCELERATED DATABASE QUERIES USING AGGREGATION DEFINITIONS

(71) Applicant: Visa International Service Association, San Francisco, CA (US)

(72) Inventors: Santosh Hegde, Bangalore (IN); Vamsi Krishna Inaganti, Bangalore (IN); Thrilok Attota, Bangalore (IN); Sandeep Sree Rama Garimella, Hyderabad (IN); Nikita Pande, Bengaluru (IN)

(73) Assignee: Visa International Service Association, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/888,582

(22) Filed: Sep. 18, 2024

(65) Prior Publication Data

US 2025/0013639 A1    Jan. 9, 2025

Related U.S. Application Data

(63) Continuation of application No. 18/095,187, filed on Jan. 10, 2023, now Pat. No. 12,124,444.

(51) Int. Cl.
*G06F 16/2453* (2019.01)
*G06F 16/2455* (2019.01)

(52) U.S. Cl.
CPC .. *G06F 16/24537* (2019.01); *G06F 16/24556* (2019.01)

(58) Field of Classification Search
CPC .............. G06F 16/24537; G06F 16/24556
(Continued)

(56) References Cited

U.S. PATENT DOCUMENTS 7,593,926 B2 *  9/2009  Larson .............. G06F 16/24537
                                                707/999.005
7,769,755 B2 *  8/2010  Meijer .............. G06F 16/24537
                                                707/808

(Continued)

OTHER PUBLICATIONS

Microsoft Learn "Query processing architecture guide", https://learn.microsoft.com/en-us/sql/relational-databases/query-processing-architecture-guide?view=sql-server-ver16, Sep. 2, 2022, 68 pages.

(Continued)

*Primary Examiner* — Michael Pham
(74) *Attorney, Agent, or Firm* — The Webb Law Firm

(57) ABSTRACT

Described are a system, method, and computer program product for accelerated database queries using aggregation definitions. The method includes receiving a first set of database queries and parsing each query to produce a plurality of query parameters. The method also includes determining a plurality of frequencies based on a frequency of each query parameter occurring in the first set of database queries. The method further includes generating a plurality of aggregation definitions based on the plurality of query parameters and the plurality of frequencies. The method further includes determining a candidate set of aggregation definitions from the plurality of aggregation definitions, based on a number of queries that would be at least partially satisfied by each aggregation definition of the plurality of aggregation definitions. The method further includes generating an aggregated dataset based on the candidate set of aggregation definitions and performing a database query using the aggregated dataset.

20 Claims, 6 Drawing Sheets

(58) Field of Classification Search
USPC .......................................................... 707/713
See application file for complete search history.

(56) References Cited

U.S. PATENT DOCUMENTS

| | | | | |
|---|---|---|---|---|
| 7,987,178 | B2* | 7/2011 | Hueske | G06F 16/217 |
| | | | | 707/718 |
| 8,041,670 | B2* | 10/2011 | Bakalash | G06F 16/24556 |
| | | | | 707/603 |
| 11,263,268 | B1* | 3/2022 | Bourbie | G06F 16/2228 |
| 2012/0173519 | A1 | 7/2012 | Buessow et al. | |
| 2022/0121685 | A1 | 4/2022 | Zheng et al. | |

OTHER PUBLICATIONS

Oracle Help Center, "Database Data Warehousing Guide: 20 SQL for Aggregation in Data Warehouses", https://docs.oracle.com/cd/B19306_01/server.102/b14223/aggreg.htm#i1007462, accessed Aug. 2021, 27 pages.

Regev et al., "Approximating Aggregated SQL Queries With LSTM Networks", Jan. 5, 2021, 10 pages.

Timko et al., "Probability Distributions as Pre-Aggregated Data in Data Warehouses", A DB Technical Report, Oct. 19, 2005, 49 pages.

* cited by examiner

SYSTEM, METHOD, AND COMPUTER PROGRAM PRODUCT FOR ACCELERATED DATABASE QUERIES USING AGGREGATION DEFINITIONS

CROSS REFERENCE TO RELATED APPLICATION

This application is a continuation of U.S. patent application Ser. No. 18/095,187, filed Jan. 10, 2023, the disclosure of which is hereby incorporated by reference in its entirety.

BACKGROUND

1. Technical Field

This disclosure relates generally to queryable database systems and, in non-limiting embodiments or aspects, to systems, methods, and computer program products for accelerated database queries using aggregation definitions to generate aggregated datasets.

2. Technical Considerations

Databases may store data that can be created, read, updated, or deleted in response to a database query, e.g., a request to access data from the database to manipulate the data or retrieve the data. Certain queries may require one or more cells, records, columns, tables, and/or the like to be combined before the results of the query are provided in a query response. Queries may become inefficient when they are performed on large datasets, due to the scaling of computing resources (e.g., memory, bandwidth, processing speed, etc.) in relation to the size of the accessed and/or aggregated data. Moreover, any inefficiencies in individual queries may be compounded when the number of queries being performed are also scaled up. For example, networked systems having one or more databases that store vast amounts of data may require an inefficient amount of computing resources to process a number of ongoing queries in real-time, which may likewise take an increased amount of time to complete. By way of further example, if ninety out of a hundred queries require at least one of the same parameters for data aggregation, then the same aggregation steps may be repeated upwards of ninety times, one for each query that specifies the same parameters for data aggregation.

There is a need in the art for a technical solution to reduce the computing resources and processing time when queries are performed in a system having one or more databases.

SUMMARY

According to some non-limiting embodiments or aspects, provided are systems, methods, and computer program products for accelerated database queries using aggregation definitions that overcome some or all of the deficiencies identified above.

According to some non-limiting embodiments or aspects, provided is a computer-implemented method for accelerated database queries using aggregation definitions. The method includes receiving, with at least one processor, a first set of database queries. The method also includes parsing, with at least one processor, each query of the first set of database queries to produce a plurality of query parameters. The method further includes determining, with at least one processor, a plurality of frequencies based on a frequency of each query parameter of the plurality of query parameters occurring in the first set of database queries. The method further includes generating, with at least one processor, a plurality of aggregation definitions based on the plurality of query parameters and the plurality of frequencies. Generating the plurality of aggregation definitions based on the plurality of query parameters and the plurality of frequencies includes determining a set of query parameters of the plurality of query parameters that have highest frequencies in the plurality of frequencies. Generating the plurality of aggregation definitions based on the plurality of query parameters and the plurality of frequencies also includes generating each aggregation definition of the plurality of aggregation definitions using a combination of query parameters from the set of query parameters that have the highest frequencies. The method further includes determining, with at least one processor, a candidate set of aggregation definitions from the plurality of aggregation definitions, based on a number of queries of a second set of database queries that would be at least partially satisfied by each aggregation definition of the plurality of aggregation definitions. The method further includes generating, with at least one processor, at least one aggregated dataset based on the candidate set of aggregation definitions. The method further includes performing, with at least one processor, at least one database query using the at least one aggregated dataset.

In some non-limiting embodiments or aspects, the first set of database queries may include the second set of database queries. At least one query parameter of the plurality of query parameters may include at least one of: a selection of a column, a grouping of two or more columns, a predicate column, an expression, or any combination thereof.

In some non-limiting embodiments or aspects, the method may include performing, with at least one processor, a plurality of database queries in a first time period. The method may also include storing, with at least one processor, at least a portion of the plurality of database queries in a first data store in the first time period to produce stored database queries. Receiving the first set of database queries may include retrieving at least a portion of the stored database queries from the first data store, wherein the at least a portion of the stored database queries includes the first set of database queries.

In some non-limiting embodiments or aspects, generating the at least one aggregated dataset may include generating the at least one aggregated dataset in a second time period after the first time period. Generating the at least one aggregated dataset may also include storing the at least one aggregated dataset in a second data store in the second time period. Performing the at least one database query using the at least one aggregated dataset may include receiving at least one request including the at least one database query in a third time period after the second time period. Performing the at least one database query using the at least one aggregated dataset may also include retrieving the at least one aggregated dataset from the second data store in the third time period based on the at least one request. Performing the at least one database query using the at least one aggregated dataset may further include performing the at least one database query in the third time period using the at least one aggregated dataset.

In some non-limiting embodiments or aspects, receiving the at least one request including the at least one database query may include receiving the at least one request from at least one computing device of at least one user. The method may further include transmitting, with at least one processor, at least one response to the at least one computing device including at least one result of the least one database query.

In some non-limiting embodiments or aspects, the method may further include regenerating, with at least one processor, the at least one aggregated dataset over a plurality of periodic intervals. Regenerating the at least one aggregated dataset may include, in each interval of the plurality of periodic intervals: updating the stored database queries in the first data store based on one or more database queries performed in a preceding interval of the plurality of periodic intervals, to produce updated stored database queries; receiving at least a portion of the updated stored database queries including an updated set of database queries; parsing each query of the updated set of database queries to produce an updated plurality of query parameters; determining an updated plurality of frequencies based on a frequency of each query parameter of the updated plurality of query parameters occurring in the updated set of database queries; generating an updated plurality of aggregation definitions based on the updated plurality of query parameters and the updated plurality of frequencies; determining an updated candidate set of aggregation definitions from the updated plurality of aggregation definitions; generating at least one updated aggregated dataset based on the updated candidate set of aggregation definitions; and performing one or more database queries using the at least one updated aggregated dataset.

According to some non-limiting embodiments or aspects, provided is a system for accelerated database queries using aggregation definitions. The system includes at least one processor programmed or configured to receive a first set of database queries. The at least one processor is also programmed or configured to parse each query of the first set of database queries to produce a plurality of query parameters. The at least one processor is further programmed or configured to determine a plurality of frequencies based on a frequency of each query parameter of the plurality of query parameters occurring in the first set of database queries. The at least one processor is further programmed or configured to generate a plurality of aggregation definitions based on the plurality of query parameters and the plurality of frequencies. When generating the plurality of aggregation definitions based on the plurality of query parameters and the plurality of frequencies, the at least one processor is programmed or configured to determine a set of query parameters of the plurality of query parameters that have highest frequencies in the plurality of frequencies. When generating the plurality of aggregation definitions based on the plurality of query parameters and the plurality of frequencies, the at least one processor is also programmed or configured to generate each aggregation definition of the plurality of aggregation definitions using a combination of query parameters from the set of query parameters that have the highest frequencies. The at least one processor is further programmed or configured to determine a candidate set of aggregation definitions from the plurality of aggregation definitions, based on a number of queries of a second set of database queries that would be at least partially satisfied by each aggregation definition of the plurality of aggregation definitions. The at least one processor is further programmed or configured to generate at least one aggregated dataset based on the candidate set of aggregation definitions. The at least one processor is further programmed or configured to perform at least one database query using the at least one aggregated dataset.

In some non-limiting embodiments or aspects, the first set of database queries may include the second set of database queries. At least one query parameter of the plurality of query parameters may include at least one of: a selection of a column, a grouping of two or more columns, a predicate column, an expression, or any combination thereof.

In some non-limiting embodiments or aspects, the at least one processor may be further programmed or configured to perform a plurality of database queries in a first time period. The at least one processor may be further programmed or configured to store at least a portion of the plurality of database queries in a first data store in the first time period to produce stored database queries. When receiving the first set of database queries, the at least one processor may be programmed or configured to retrieve at least a portion of the stored database queries from the first data store, wherein the at least a portion of the stored database queries includes the first set of database queries.

In some non-limiting embodiments or aspects, when generating the at least one aggregated dataset, the at least one processor may be programmed or configured to generate the at least one aggregated dataset in a second time period after the first time period. When generating the at least one aggregated dataset, the at least one processor may also be programmed or configured to store the at least one aggregated dataset in a second data store in the second time period. When performing the at least one database query using the at least one aggregated dataset, the at least one processor may be programmed or configured to receive at least one request including the at least one database query in a third time period after the second time period. When performing the at least one database query using the at least one aggregated dataset, the at least one processor may also be programmed or configured to retrieve the at least one aggregated dataset from the second data store in the third time period based on the at least one request. When performing the at least one database query using the at least one aggregated dataset, the at least one processor may be further programmed or configured to perform the at least one database query in the third time period using the at least one aggregated dataset.

In some non-limiting embodiments or aspects, when receiving the at least one request including the at least one database query, the at least one processor may be programmed or configured to receive the at least one request from at least one computing device of at least one user. The at least one processor may be further programmed or configured to transmit at least one response to the at least one computing device including at least one result of the least one database query.

In some non-limiting embodiments or aspects, the at least one processor may be further programmed or configured to regenerate the at least one aggregated dataset over a plurality of periodic intervals. When regenerating the at least one aggregated dataset, the at least one processor may be programmed or configured to, in each interval of the plurality of periodic intervals: update the stored database queries in the first data store based on one or more database queries performed in a preceding interval of the plurality of periodic intervals, to produce updated stored database queries; receive at least a portion of the updated stored database queries including an updated set of database queries; parse each query of the updated set of database queries to produce an updated plurality of query parameters; determine an updated plurality of frequencies based on a frequency of each query parameter of the updated plurality of query parameters occurring in the updated set of database queries; generate an updated plurality of aggregation definitions based on the updated plurality of query parameters and the updated plurality of frequencies; determine an updated candidate set of aggregation definitions from the updated plurality of aggregation definitions; generate at least one updated aggregated dataset based on the updated candidate set of aggregation definitions; and perform one or more database queries using the at least one updated aggregated dataset.

In some non-limiting embodiments or aspects, provided is a computer program product for accelerated database queries using aggregation definitions. The computer program product includes at least one non-transitory computer-readable medium including one or more instructions that, when executed by at least one processor, cause the at least one processor to receive a first set of database queries. The one or more instructions also cause the at least one processor to parse each query of the first set of database queries to produce a plurality of query parameters. The one or more instructions further cause the at least one processor to determine a plurality of frequencies based on a frequency of each query parameter of the plurality of query parameters occurring in the first set of database queries. The one or more instructions further cause the at least one processor to generate a plurality of aggregation definitions based on the plurality of query parameters and the plurality of frequencies. The one or more instructions that cause the at least one processor to generate the plurality of aggregation definitions based on the plurality of query parameters and the plurality of frequencies cause the at least one processor to determine a set of query parameters of the plurality of query parameters that have highest frequencies in the plurality of frequencies. The one or more instructions that cause the at least one processor to generate the plurality of aggregation definitions based on the plurality of query parameters and the plurality of frequencies also cause the at least one processor to generate each aggregation definition of the plurality of aggregation definitions using a combination of query parameters from the set of query parameters that have the highest frequencies. The one or more instructions further cause the at least one processor to determine a candidate set of aggregation definitions from the plurality of aggregation definitions, based on a number of queries of a second set of database queries that would be at least partially satisfied by each aggregation definition of the plurality of aggregation definitions. The one or more instructions further cause the at least one processor to generate at least one aggregated dataset based on the candidate set of aggregation definitions. The one or more instructions further cause the at least one processor to perform at least one database query using the at least one aggregated dataset.

In some non-limiting embodiments or aspects, the first set of database queries may include the second set of database queries. At least one query parameter of the plurality of query parameters may include at least one of: a selection of a column, a grouping of two or more columns, a predicate column, an expression, or any combination thereof.

In some non-limiting embodiments or aspects, the one or more instructions may further cause the at least one processor to perform a plurality of database queries in a first time period. The one or more instructions may further cause the at least one processor to store at least a portion of the plurality of database queries in a first data store in the first time period to produce stored database queries. The one or more instructions that cause the at least one processor to receive the first set of database queries may cause the at least one processor to retrieve at least a portion of the stored database queries from the first data store, wherein the at least a portion of the stored database queries includes the first set of database queries.

In some non-limiting embodiments or aspects, the one or more instructions that cause the at least one processor to generate the at least one aggregated dataset may cause the at least one processor to generate the at least one aggregated dataset in a second time period after the first time period. The one or more instructions that cause the at least one processor to generate the at least one aggregated dataset may also cause the at least one processor to store the at least one aggregated dataset in a second data store in the second time period. The one or more instructions that cause the at least one processor to perform the at least one database query using the at least one aggregated dataset may cause the at least one processor to receive at least one request including the at least one database query in a third time period after the second time period. The one or more instructions that cause the at least one processor to perform the at least one database query using the at least one aggregated dataset may also cause the at least one processor to retrieve the at least one aggregated dataset from the second data store in the third time period based on the at least one request. The one or more instructions that cause the at least one processor to perform the at least one database query using the at least one aggregated dataset may further cause the at least one processor to perform the at least one database query in the third time period using the at least one aggregated dataset.

In some non-limiting embodiments or aspects, the one or more instructions that cause the at least one processor to receive the at least one request including the at least one database query may cause the at least one processor to receive the at least one request from at least one computing device of at least one user. The one or more instructions may further cause the at least one processor to transmit at least one response to the at least one computing device including at least one result of the least one database query.

In some non-limiting embodiments or aspects, the one or more instructions may further cause the at least one processor to regenerate the at least one aggregated dataset over a plurality of periodic intervals. The one or more instructions that cause the at least one processor to regenerate the at least one aggregated dataset may cause the at least one processor to, in each interval of the plurality of periodic intervals: update the stored database queries in the first data store based on one or more database queries performed in a preceding interval of the plurality of periodic intervals, to produce updated stored database queries; receive at least a portion of the updated stored database queries including an updated set of database queries; parse each query of the updated set of database queries to produce an updated plurality of query parameters; determine an updated plurality of frequencies based on a frequency of each query parameter of the updated plurality of query parameters occurring in the updated set of database queries; generate an updated plurality of aggregation definitions based on the updated plurality of query parameters and the updated plurality of frequencies; determine an updated candidate set of aggregation definitions from the updated plurality of aggregation definitions; generate at least one updated aggregated dataset based on the updated candidate set of aggregation definitions; and perform one or more database queries using the at least one updated aggregated dataset.

Other non-limiting embodiments or aspects will be set forth in the following numbered clauses:

Clause 1: A computer-implemented method comprising: receiving, with at least one processor, a first set of database queries; parsing, with at least one processor, each query of the first set of database queries to produce a plurality of query parameters; determining, with at least one processor, a plurality of frequencies based on a frequency of each query parameter of the plurality of query parameters occurring in the first set of database queries; generating, with at least one processor, a plurality of aggregation definitions based on the plurality of query parameters and the plurality of frequencies, wherein generating the plurality of aggregation definitions based on the plurality of query parameters and the plurality of frequencies comprises: determining a set of query parameters of the plurality of query parameters that have highest frequencies in the plurality of frequencies; and generating each aggregation definition of the plurality of aggregation definitions using a combination of query parameters from the set of query parameters that have the highest frequencies; determining, with at least one processor, a candidate set of aggregation definitions from the plurality of aggregation definitions, based on a number of queries of a second set of database queries that would be at least partially satisfied by each aggregation definition of the plurality of aggregation definitions; generating, with at least one processor, at least one aggregated dataset based on the candidate set of aggregation definitions; and performing, with at least one processor, at least one database query using the at least one aggregated dataset.

Clause 2: The computer-implemented method of clause 1, wherein the first set of database queries comprises the second set of database queries.

Clause 3: The computer-implemented method of clause 1 or clause 2, wherein at least one query parameter of the plurality of query parameters comprises at least one of: a selection of a column, a grouping of two or more columns, a predicate column, an expression, or any combination thereof.

Clause 4: The computer-implemented method of any of clauses 1-3, further comprising: performing, with at least one processor, a plurality of database queries in a first time period; and storing, with at least one processor, at least a portion of the plurality of database queries in a first data store in the first time period to produce stored database queries; wherein receiving the first set of database queries comprises: retrieving at least a portion of the stored database queries from the first data store, wherein the at least a portion of the stored database queries comprises the first set of database queries.

Clause 5: The computer-implemented method of any of clauses 1-4, wherein generating the at least one aggregated dataset comprises: generating the at least one aggregated dataset in a second time period after the first time period; and storing the at least one aggregated dataset in a second data store in the second time period; and wherein performing the at least one database query using the at least one aggregated dataset comprises: receiving at least one request comprising the at least one database query in a third time period after the second time period; retrieving the at least one aggregated dataset from the second data store in the third time period based on the at least one request; and performing the at least one database query in the third time period using the at least one aggregated dataset.

Clause 6: The computer-implemented method of any of clauses 1-5, wherein receiving the at least one request comprising the at least one database query comprises: receiving the at least one request from at least one computing device of at least one user; the method further comprising: transmitting, with at least one processor, at least one response to the at least one computing device comprising at least one result of the least one database query.

Clause 7: The computer-implemented method of any of clauses 1-6, further comprising regenerating, with at least one processor, the at least one aggregated dataset over a plurality of periodic intervals, wherein regenerating the at least one aggregated dataset comprises, in each interval of the plurality of periodic intervals: updating the stored database queries in the first data store based on one or more database queries performed in a preceding interval of the plurality of periodic intervals, to produce updated stored database queries; receiving at least a portion of the updated stored database queries comprising an updated set of database queries; parsing each query of the updated set of database queries to produce an updated plurality of query parameters; determining an updated plurality of frequencies based on a frequency of each query parameter of the updated plurality of query parameters occurring in the updated set of database queries; generating an updated plurality of aggregation definitions based on the updated plurality of query parameters and the updated plurality of frequencies; determining an updated candidate set of aggregation definitions from the updated plurality of aggregation definitions; generating at least one updated aggregated dataset based on the updated candidate set of aggregation definitions; and performing one or more database queries using the at least one updated aggregated dataset.

Clause 8: A system comprising at least one processor programmed or configured to: receive a first set of database queries; parse each query of the first set of database queries to produce a plurality of query parameters; determine a plurality of frequencies based on a frequency of each query parameter of the plurality of query parameters occurring in the first set of database queries; generate a plurality of aggregation definitions based on the plurality of query parameters and the plurality of frequencies, wherein, when generating the plurality of aggregation definitions based on the plurality of query parameters and the plurality of frequencies, the at least one processor is programmed or configured to: determine a set of query parameters of the plurality of query parameters that have highest frequencies in the plurality of frequencies; and generate each aggregation definition of the plurality of aggregation definitions using a combination of query parameters from the set of query parameters that have the highest frequencies; determine a candidate set of aggregation definitions from the plurality of aggregation definitions, based on a number of queries of a second set of database queries that would be at least partially satisfied by each aggregation definition of the plurality of aggregation definitions; generate at least one aggregated dataset based on the candidate set of aggregation definitions; and perform at least one database query using the at least one aggregated dataset.

Clause 9: The system of clause 8, wherein the first set of database queries comprises the second set of database queries.

Clause 10: The system of clause 8 or clause 9, wherein at least one query parameter of the plurality of query parameters comprises at least one of: a selection of a column, a grouping of two or more columns, a predicate column, an expression, or any combination thereof.

Clause 11: The system of any of clauses 8-10, wherein the at least one processor is further programmed or configured to: perform a plurality of database queries in a first time period; and store at least a portion of the plurality of database queries in a first data store in the first time period to produce stored database queries; and wherein, when receiving the first set of database queries, the at least one processor is programmed or configured to: retrieve at least a portion of the stored database queries from the first data store, wherein the at least a portion of the stored database queries comprises the first set of database queries.

Clause 12: The system of any of clauses 8-11, wherein, when generating the at least one aggregated dataset, the at least one processor is programmed or configured to: generate the at least one aggregated dataset in a second time period after the first time period; and store the at least one aggregated dataset in a second data store in the second time period; and wherein, when performing the at least one database query using the at least one aggregated dataset, the at least one processor is programmed or configured to: receive at least one request comprising the at least one database query in a third time period after the second time period; retrieve the at least one aggregated dataset from the second data store in the third time period based on the at least one request; and perform the at least one database query in the third time period using the at least one aggregated dataset.

Clause 13: The system of any of clauses 8-12, wherein, when receiving the at least one request comprising the at least one database query, the at least one processor is programmed or configured to: receive the at least one request from at least one computing device of at least one user; and wherein the at least one processor is further programmed or configured to: transmit at least one response to the at least one computing device comprising at least one result of the least one database query.

Clause 14: The system of any of clauses 8-13, wherein the at least one processor is further programmed or configured to regenerate the at least one aggregated dataset over a plurality of periodic intervals, wherein, when regenerating the at least one aggregated dataset, the at least one processor is programmed or configured to, in each interval of the plurality of periodic intervals: update the stored database queries in the first data store based on one or more database queries performed in a preceding interval of the plurality of periodic intervals, to produce updated stored database queries; receive at least a portion of the updated stored database queries comprising an updated set of database queries; parse each query of the updated set of database queries to produce an updated plurality of query parameters; determine an updated plurality of frequencies based on a frequency of each query parameter of the updated plurality of query parameters occurring in the updated set of database queries; generate an updated plurality of aggregation definitions based on the updated plurality of query parameters and the updated plurality of frequencies; determine an updated candidate set of aggregation definitions from the updated plurality of aggregation definitions; generate at least one updated aggregated dataset based on the updated candidate set of aggregation definitions; and perform one or more database queries using the at least one updated aggregated dataset.

Clause 15: A computer program product comprising at least one non-transitory computer-readable medium comprising one or more instructions that, when executed by at least one processor, cause the at least one processor to: receive a first set of database queries; parse each query of the first set of database queries to produce a plurality of query parameters; determine a plurality of frequencies based on a frequency of each query parameter of the plurality of query parameters occurring in the first set of database queries; generate a plurality of aggregation definitions based on the plurality of query parameters and the plurality of frequencies, wherein the one or more instructions that cause the at least one processor to generate the plurality of aggregation definitions based on the plurality of query parameters and the plurality of frequencies cause the at least one processor to: determine a set of query parameters of the plurality of query parameters that have highest frequencies in the plurality of frequencies; and generate each aggregation definition of the plurality of aggregation definitions using a combination of query parameters from the set of query parameters that have the highest frequencies; determine a candidate set of aggregation definitions from the plurality of aggregation definitions, based on a number of queries of a second set of database queries that would be at least partially satisfied by each aggregation definition of the plurality of aggregation definitions; generate at least one aggregated dataset based on the candidate set of aggregation definitions; and perform at least one database query using the at least one aggregated dataset.

Clause 16: The computer program product of clause 15, wherein at least one query parameter of the plurality of query parameters comprises at least one of: a selection of a column, a grouping of two or more columns, a predicate column, an expression, or any combination thereof.

Clause 17: The computer program product of clause 15 or clause 16, wherein the one or more instructions further cause the at least one processor to: perform a plurality of database queries in a first time period; and store at least a portion of the plurality of database queries in a first data store in the first time period to produce stored database queries; and wherein the one or more instructions that cause the at least one processor to receive the first set of database queries cause the at least one processor to: retrieve at least a portion of the stored database queries from the first data store, wherein the at least a portion of the stored database queries comprises the first set of database queries.

Clause 18: The computer program product of any of clauses 15-17, wherein the one or more instructions that cause the at least one processor to generate the at least one aggregated dataset cause the at least one processor to: generate the at least one aggregated dataset in a second time period after the first time period; and store the at least one aggregated dataset in a second data store in the second time period; and wherein the one or more instructions that cause the at least one processor to perform the at least one database query using the at least one aggregated dataset cause the at least one processor to: receive at least one request comprising the at least one database query in a third time period after the second time period; retrieve the at least one aggregated dataset from the second data store in the third time period based on the at least one request; and perform the at least one database query in the third time period using the at least one aggregated dataset.

Clause 19: The computer program product of any of clauses 15-18, wherein the one or more instructions that cause the at least one processor to receive the at least one request comprising the at least one database query cause the at least one processor to: receive the at least one request from at least one computing device of at least one user; and wherein the one or more instructions further cause the at least one processor to: transmit at least one response to the at least one computing device comprising at least one result of the least one database query.

Clause 20: The computer program product of any of clauses 15-19, wherein the one or more instructions further cause the at least one processor to regenerate the at least one aggregated dataset over a plurality of periodic intervals, wherein the one or more instructions that cause the at least one processor to regenerate the at least one aggregated dataset cause the at least one processor to, in each interval of the plurality of periodic intervals: update the stored database queries in the first data store based on one or more database queries performed in a preceding interval of the plurality of periodic intervals, to produce updated stored database queries; receive at least a portion of the updated stored database queries comprising an updated set of database queries; parse each query of the updated set of database queries to produce an updated plurality of query parameters; determine an updated plurality of frequencies based on a frequency of each query parameter of the updated plurality of query parameters occurring in the updated set of database queries; generate an updated plurality of aggregation definitions based on the updated plurality of query parameters and the updated plurality of frequencies; determine an updated candidate set of aggregation definitions from the updated plurality of aggregation definitions; generate at least one updated aggregated dataset based on the updated candidate set of aggregation definitions; and perform one or more database queries using the at least one updated aggregated dataset.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the present disclosure. As used in the specification and the claims, the singular form of "a," "an," and "the" include plural referents unless the context clearly dictates otherwise.

BRIEF DESCRIPTION OF THE DRAWINGS

Additional advantages and details of the disclosure are explained in greater detail below with reference to the exemplary embodiments or aspects that are illustrated in the accompanying schematic figures, in which.

DETAILED DESCRIPTION

Figure 1:
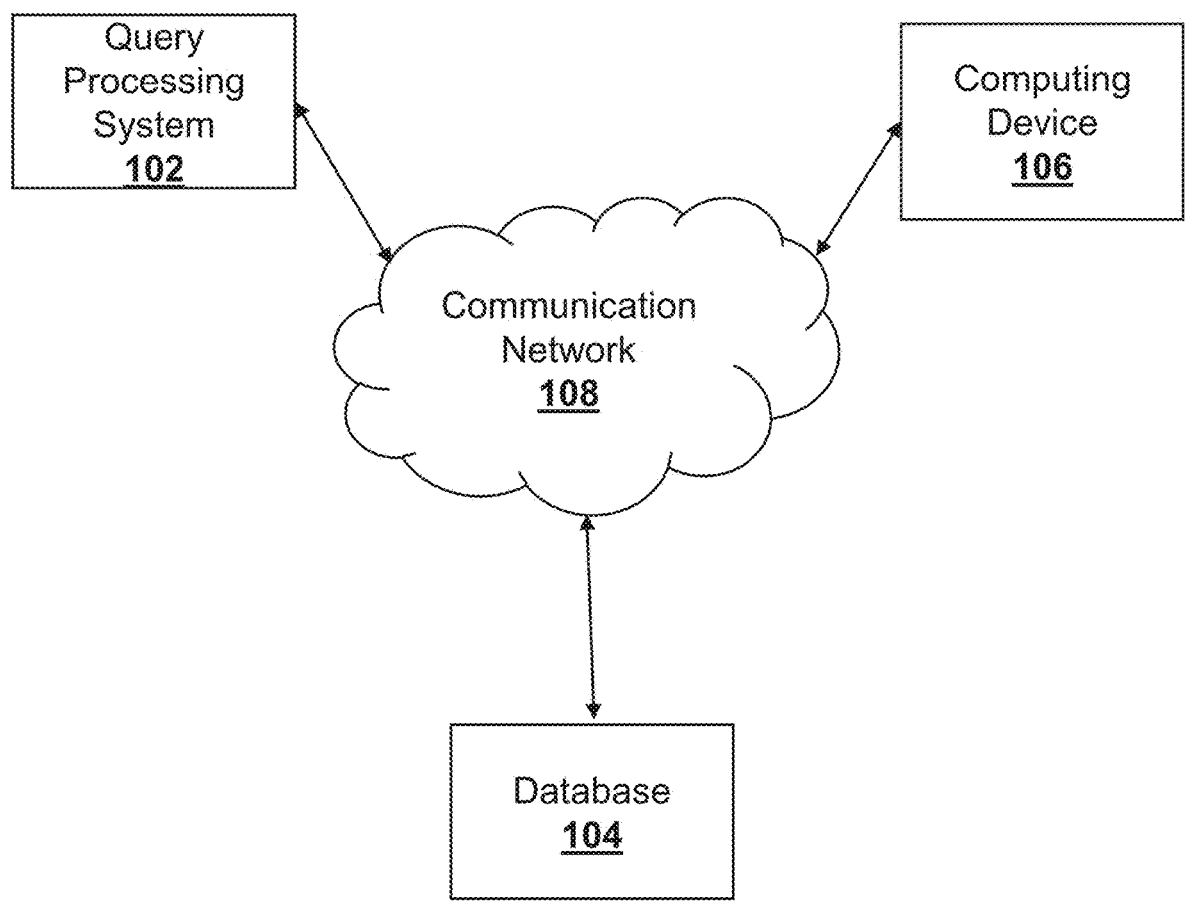
FIG. 1 is a diagram of a non-limiting embodiment or aspect of an environment in which systems, devices, products, apparatus, and/or methods, described herein, may be implemented, according to the principles of the present disclosure.

For purposes of the description hereinafter, the terms "upper", "lower", "right", "left", "vertical", "horizontal", "top", "bottom", "lateral", "longitudinal," and derivatives thereof shall relate to non-limiting embodiments or aspects as they are oriented in the drawing figures. However, it is to be understood that non-limiting embodiments or aspects may assume various alternative variations and step sequences, except where expressly specified to the contrary. It is also to be understood that the specific devices and processes illustrated in the attached drawings, and described in the following specification, are simply exemplary embodiments or aspects. Hence, specific dimensions and other physical characteristics related to the embodiments or aspects disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise. The phase "based on" may also mean "in response to" where appropriate.

Some non-limiting embodiments or aspects are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, and/or the like.

As used herein, the term "acquirer institution" may refer to an entity licensed and/or approved by a transaction service provider to originate transactions (e.g., payment transactions) using a payment device associated with the transaction service provider. The transactions the acquirer institution may originate may include payment transactions (e.g., purchases, original credit transactions (OCTs), account funding transactions (AFTs), and/or the like). In some non-limiting embodiments or aspects, an acquirer institution may be a financial institution, such as a bank. As used herein, the term "acquirer system" may refer to one or more computing devices operated by or on behalf of an acquirer institution, such as a server computer executing one or more software applications.

As used herein, the term "account identifier" may include one or more primary account numbers (PANs), tokens, or other identifiers associated with a customer account. The term "token" may refer to an identifier that is used as a substitute or replacement identifier for an original account identifier, such as a PAN. Account identifiers may be alphanumeric or any combination of characters and/or symbols. Tokens may be associated with a PAN or other original account identifier in one or more data structures (e.g., one or more databases, and/or the like) such that they may be used to conduct a transaction without directly using the original account identifier. In some examples, an original account identifier, such as a PAN, may be associated with a plurality of tokens for different individuals or purposes.

As used herein, the term "communication" may refer to the reception, receipt, transmission, transfer, provision, and/ or the like of data (e.g., information, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit processes information received from the first unit and communicates the processed information to the second unit.

As used herein, the term "computing device" may refer to one or more electronic devices configured to process data. A computing device may, in some examples, include the necessary components to receive, process, and output data, such as a processor, a display, a memory, an input device, a network interface, and/or the like. A computing device may be a mobile device. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. A computing device may also be a desktop computer or other form of non-mobile computer.

As used herein, the terms "electronic wallet" and "electronic wallet application" refer to one or more electronic devices and/or software applications configured to initiate and/or conduct payment transactions. For example, an electronic wallet may include a mobile device executing an electronic wallet application, and may further include server-side software and/or databases for maintaining and providing transaction data to the mobile device. An "electronic wallet provider" may include an entity that provides and/or maintains an electronic wallet for a customer, such as Google Pay®, Android Pay®, Apple Pay®, Samsung Pay®, and/or other like electronic payment systems. In some non-limiting examples, an issuer bank may be an electronic wallet provider.

As used herein, the term "issuer institution" may refer to one or more entities, such as a bank, that provide accounts to customers for conducting transactions (e.g., payment transactions), such as initiating credit and/or debit payments. For example, an issuer institution may provide an account identifier, such as a PAN, to a customer that uniquely identifies one or more accounts associated with that customer. The account identifier may be embodied on a portable financial device, such as a physical financial instrument, e.g., a payment card, and/or may be electronic and used for electronic payments. The term "issuer system" refers to one or more computer devices operated by or on behalf of an issuer institution, such as a server computer executing one or more software applications. For example, an issuer system may include one or more authorization servers for authorizing a transaction.

As used herein, the term "merchant" may refer to an individual or entity that provides goods and/or services, or access to goods and/or services, to customers based on a transaction, such as a payment transaction. The term "merchant" or "merchant system" may also refer to one or more computer systems operated by or on behalf of a merchant, such as a server computer executing one or more software applications.

As used herein, a "point-of-sale (POS) device" may refer to one or more devices, which may be used by a merchant to conduct a transaction (e.g., a payment transaction) and/or process a transaction. For example, a POS device may include one or more client devices. Additionally or alternatively, a POS device may include peripheral devices, card readers, scanning devices (e.g., code scanners), Bluetooth® communication receivers, near-field communication (NFC) receivers, radio frequency identification (RFID) receivers, and/or other contactless transceivers or receivers, contact-based receivers, payment terminals, and/or the like. As used herein, a "point-of-sale (POS) system" may refer to one or more client devices and/or peripheral devices used by a merchant to conduct a transaction. For example, a POS system may include one or more POS devices and/or other like devices that may be used to conduct a payment transaction. In some non-limiting embodiments or aspects, a POS system (e.g., a merchant POS system) may include one or more server computers programmed or configured to process online payment transactions through webpages, mobile applications, and/or the like.

As used herein, the terms "client" and "client device" may refer to one or more client-side devices or systems (e.g., remote from a transaction service provider) used to initiate or facilitate a transaction (e.g., a payment transaction). As an example, a "client device" may refer to one or more POS devices used by a merchant, one or more acquirer host computers used by an acquirer, one or more mobile devices used by a user, one or more computing devices used by a payment device provider system, and/or the like. In some non-limiting embodiments or aspects, a client device may be an electronic device configured to communicate with one or more networks and initiate or facilitate transactions. For example, a client device may include one or more computers, portable computers, laptop computers, tablet computers, mobile devices, cellular phones, wearable devices (e.g., watches, glasses, lenses, clothing, and/or the like), PDAs, and/or the like. Moreover, a "client" may also refer to an entity (e.g., a merchant, an acquirer, and/or the like) that owns, utilizes, and/or operates a client device for initiating transactions (e.g., for initiating transactions with a transaction service provider).

As used herein, the term "payment device" may refer to a payment card (e.g., a credit or debit card), a gift card, a smartcard, smart media, a payroll card, a healthcare card, a wristband, a machine-readable medium containing account information, a keychain device or fob, an RFID transponder, a retailer discount or loyalty card, a cellular phone, an electronic wallet mobile application, a PDA, a pager, a security card, a computing device, an access card, a wireless terminal, a transponder, and/or the like. In some non-limiting embodiments or aspects, the payment device may include volatile or non-volatile memory to store information (e.g., an account identifier, a name of the account holder, and/or the like).

As used herein, the term "server" may refer to or include one or more computing devices that are operated by or facilitate communication and processing for multiple parties in a network environment, such as the internet, although it will be appreciated that communication may be facilitated over one or more public or private network environments and that various other arrangements are possible. Further, multiple computing devices (e.g., servers, POS devices, mobile devices, etc.) directly or indirectly communicating in the network environment may constitute a "system." Reference to "a server" or "a processor," as used herein, may refer to a previously recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network such as Visa® or any other entity that processes transactions. The term "transaction processing system" may refer to one or more computer systems operated by or on behalf of a transaction service provider, such as a transaction processing server executing one or more software applications. A transaction processing server may include one or more processors and, in some non-limiting embodiments or aspects, may be operated by or on behalf of a transaction service provider.

The systems, methods, and computer program products described herein provide numerous technical advantages in systems for processing queries that require data aggregation. First, the described methods generate aggregated datasets (e.g., combinations of cells, records, columns, tables, and/or the like) for use in queries, to avoid having to perform the data aggregations each and every time a query calls for that particular type of aggregation (e.g., specifying the same parameters for aggregating data, such as which columns to select, which columns to group, which predicate column to use, what range of record values to select, etc.). For example, it is an apparent reduction in computing resources to prepare an aggregated dataset in a first time period that can be used multiple times for queries in subsequent time periods, thereby eliminating duplicative aggregation for queries that require the same type of aggregation. In this manner, generating at least one aggregated dataset and performing database queries using the at least one aggregated dataset reduces computing resource requirements for the system by removing duplicative aggregation. Practical tests of the described methods revealed that running queries with pre-generated aggregate datasets, according to the non-limiting embodiments or aspects herein, cut computer processing time to a mere fraction of the time required to run the same queries without the pre-generated aggregate datasets.

The foregoing notwithstanding, it is possible to further optimize a database system rather than pre-generating and storing every possible combination of data aggregations. To that end, the described methods provide a further technical improvement by generating aggregated datasets based on candidate sets of aggregation definitions (e.g., sets likely to provide the intended computational efficiencies), which may be intelligently determined such that (i) the number of queries that are satisfied by any given aggregated dataset (e.g., a query's parameters specify at least one aggregation of data that is included in a pre-generated aggregated dataset) is maximized, and (ii) the number of aggregated datasets required to be stored is minimized relative to maximizing the number of queries that are satisfied by all stored aggregated datasets. In this manner, computing resources are saved by having aggregated datasets in the first instance, and additional computing resources are saved by avoiding generating and storing aggregated datasets that are unlikely to be used for queries in the future. For example, by parsing known queries to determine their query parameters, determining the frequency of each query parameter occurring, and generating aggregation definitions based on the query parameters and their frequencies, a plurality of aggregation definitions may be generated that are more likely to satisfy future queries. Moreover, by determining a candidate set of aggregation definitions based on a number of known queries that would be at least partially satisfied by each generated aggregation definition, aggregated datasets may be produced with a high likelihood of maximizing the number of future queries that would be satisfied by each given aggregated dataset.

Furthermore, certain described methods also provide the technical benefit of an iteratively improving aggregated dataset that is periodically updated to more accurately reflect the types of queries that are being run in the present time period. Periodic updates to reflect recent query activity may better capture seasonal deviations or trends in processed queries. For example, by regenerating the at least one aggregated dataset over periodic intervals (e.g., days, weeks, months, etc.) based on queries that were performed in each preceding time interval, the aggregated dataset may be more likely to satisfy a larger proportion of queries in the present time period than if it had never been updated over time. Periodic regeneration of the at least one aggregated dataset magnifies the computing resource efficiencies of the underlying methods.

Referring now to FIG. 1, FIG. 1 is a diagram of an example environment 100 in which devices, systems, and/or methods, described herein, may be implemented. As shown in FIG. 1, environment 100 may include query processing system 102, database 104, computing device 106, and communication network 108. Query processing system 102, database 104, and computing device 106 may interconnect (e.g., establish a connection to communicate) via wired connections, wireless connections, or a combination of wired and wireless connections.

Query processing system 102 may include one or more computing devices 106 configured to communicate with database 104 and/or computing device 106 at least partly over communication network 108. Query processing system 102 may be configured to receive one or more requests (e.g., messages), which may include one or more queries (e.g., requests to access data in one or more databases to create, read, update, and/or delete data therein). In some non-limiting embodiments or aspects, the request may be the query itself. Query processing system 102 may receive requests including queries from one or more computing devices 106 in environment 100. Each query may include one or more query parameters, including but not limited to, one or more selections of one or more columns, one or more groupings of two or more columns, one or more predicate columns (e.g., table columns that may be used as predicates, such as to join, filter, group, and/or the like, based on query parameters), one or more expressions (e.g., where record value X is greater than value Y, where record value Q includes search term "RST", where record value J equals record value K, etc.), and/or the like, including combinations thereof. Queries may be formatted in one or more query languages, including but not limited to Structured Query Language (SQL). Query processing system 102 may receive a plurality of queries over time. Query processing system 102 may save queries (e.g., during or after the queries are performed) in database 104. Query processing system 102 may include or be associated with database 104. In some non-limiting embodiments or aspects, query processing system 102 may be included in a system that generates and/or stores the data that is persistently stored in database 104, which may be queried by queries processed by query processing system 102. Query processing system 102 may perform (e.g., execute, process, return results for, and/or the like) one or more queries received by query processing system 102.

Database 104 may include one or more computing devices 106 configured to communicate with query processing system 102 and/or computing device 106 at least partly over communication network 108. Database 104 may include one or more data stores (e.g., repositories for persistently storing and managing collections of data). Database 104 may include one or more relational databases (e.g., organized collections of structured data that store and provide access to data records that are related to one another). Database 104 may persistently store, in memory, one or more sets of data in one or more data stores. Database 104 may be included in, or associated with, query processing system 102. In some non-limiting embodiments or aspects, database 104 may include or be associated with a server cluster storage arrangement of data.

Computing device 106 may include one or more processors that are configured to communicate with query processing system 102 and/or database 104 at least partly over communication network 108. Computing device 106 may be associated with a user and may include at least one user interface for transmitting data to and receiving data from query processing system 102 and/or database 104. For example, computing device 106 may transmit to query processing system 102 one or more requests including one or more queries of database 104. By way of further example, computing device 106 may receive, from query processing system 102, one or more responses including one or more results (e.g., an indication that data was created, a portion of data to be read by computing device 106, an indication that data was updated, an indication that data was deleted, or any combination thereof) of queries processed by query processing system 102 in response to the requests transmitted by computing device 106. In some non-limiting embodiments or aspects, a plurality of computing devices 106 may be present in a network that includes query processing system 102 and database 104, and the plurality of computing devices 106 may, in an ongoing manner, transmit requests including queries to query processing system 102 and receive responses to those requests from query processing system 102. The larger the scale of such a network, the more salient the computational efficiencies provided by the described methods.

Communication network 108 may include one or more wired and/or wireless networks over which the systems and devices of environment 100 may communicate. For example, communication network 108 may include a cellular network (e.g., a long-term evolution (LTE®) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or a combination of these or other types of networks.

The number and arrangement of devices and networks shown in FIG. 1 are provided as an example. There may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally or alternatively, a set of devices (e.g., one or more devices) of environment 100 may perform one or more functions described as being performed by another set of devices of environment 100.

In some non-limiting embodiments or aspects, query processing system 102 may perform a plurality of database queries in a first time period. Query processing system 102 may perform database queries as included in requests from computing devices 106 in environment 100. During or after performance of the plurality of database queries, query processing system 102 may store at least a portion of the plurality of database queries in database 104 in the first time period to produce stored database queries. In this manner, historic database queries may be stored and referenced as a basis for the creation of one or more aggregated datasets.

In some non-limiting embodiments or aspects, query processing system 102 may receive a first set of database queries. For example, query processing system 102 may retrieve at least a portion of the stored database queries from database 104 that includes the first set of database queries. Additionally or alternatively, the first set of database queries may be included in a plurality of requests to query processing system 102 from computing devices 106. The first set of database queries may include one or more queries related to data stored in database 104. Query processing system 102 may parse each query of the first set of database queries to produce a plurality of query parameters. Query processing system 102 may store the plurality of query parameters in a parameter repository of database 104. When parsing each query of the first set of database queries, query processing system 102 may break down each query into constituent query components, one for each parameter of the query. To illustrate, a query of the first set of database queries may specify (e.g., in pseudocode representation): SELECT all_records FROM joined_table that is a JOIN of doctor_table AND hospital_table BY doctor_location_column EQUALS hospital_location_column WHERE doctor_salary_column IS GREATER THAN OR EQUAL TO a value of $100,000 AND hospital_location_column IS Pittsburgh, Pennsylvania. Such a query's parameters may include, but are not limited to: an expression related to "doctor_salary_column" being greater than or equal to a value, an expression related to "hospital_location_column" being equal to a location, a grouping of tables "doctor_table" and "hospital_table", a selection of all records that meet certain expression conditions, predicate columns of "doctor_location_column" and "hospital_location_column", and/or the like.

In some non-limiting embodiments or aspects, query processing system 102 may determine a plurality of frequencies based on a frequency of each query parameter of the plurality of query parameters occurring in the first set of database queries. A frequency of a query parameter may be a count of the number of times the query parameter (e.g., or a query parameter of equivalent function and specificity) was included in the first set of database queries. Query processing system 102 may determine a frequency of each query parameter of the plurality of query parameters and store the frequencies in association with the plurality of query parameters in a parameter repository of database 104. Returning to the illustration, the first set of database queries may include one hundred queries processed by query processing system 102. Query processing system 102 may parse the set of one hundred queries and determine that a first query parameter including an expression related to "doctor_ salary_column" being greater than a value of "$100,000" had a frequency of ten times, a second query parameter including an expression related to "hospital_location_column" being equal to "Pittsburgh, Pennsylvania" had a frequency of thirty times, a third query parameter including a grouping of tables "doctor_table" and "hospital_table" had a frequency of sixty times, and a fourth query parameter including predicate columns of "doctor_location_column and "hospital_location_column" had a frequency of fifty times.

In some non-limiting embodiments or aspects, query processing system 102 may generate a plurality of aggregation definitions (e.g., combinations of query parameters that combine data of one or more data tables) based on the plurality of query parameters and the plurality of frequencies. Query processing system 102 may generate the plurality of aggregation definitions by first determining a set of query parameters of the plurality of query parameters that have the highest frequencies in the plurality of frequencies. Query processing system 102 may then generate each aggregation definition of the plurality of aggregation definitions using a combination of query parameters from the set of query parameters that have the highest frequencies. Returning to the illustration, query processing system 102 may determine that the third query parameter (including the grouping of tables) had a highest frequency (sixty times), that fourth query parameter (including the predicate columns) had a next highest frequency (fifty times), that the second query parameter (including an expression related to "hospital_location_column") had a next highest frequency (thirty times), and that the first query parameter (including an expression related to "doctor_salary_column") had a lowest frequency (ten times). Query processing system 102 may then generate one or more aggregation definitions using the query parameters that had the highest frequencies, such as an aggregation definition that includes the third query parameter and the fourth query parameter; an aggregation definition that includes the third query parameter, the fourth query parameter, and the second query parameter; an aggregation definition that includes the third query parameter and the second query parameter; and/or the like. It will be appreciated that with larger scale of queries in a practical implementation, many more query parameters can be parsed and counted to determine a large volume of query parameters and associated frequencies, such that the aggregation definitions may include many different types of combinations of query parameters (e.g., different groups of tables, different predicate columns for expressions, different expressions for selection, etc.).

In some non-limiting embodiments or aspects, query processing system 102 may determine a candidate set of aggregation definitions from the plurality of aggregation definitions, based on a number of queries of a second set of database queries that would be at least partially satisfied by each aggregation definition of the plurality of aggregation definitions. The first set of database queries may comprise the second set of database queries. Additionally or alternatively, the second set of database queries may comprise the first set of database queries. For example, query processing system 102 may compare each database query of the second set of database queries to each aggregation definition of the plurality of aggregation definitions to determine how many of the second set of database queries would at least be partially satisfied by each aggregation definition (e.g., the aggregation definition includes one or more query parameters included in and/or required by the database query, which may be one, some, or all of the query parameters included in and/or required by the database query). The aggregation definitions that at least partially satisfy the most queries of the second set of database queries (e.g., the top one, two, or more aggregation definitions) may be designated as included in the candidate set of aggregation definitions. Query processing system 102 may also compare a count of the number of queries that each aggregation definition satisfies (at least partially) to a predetermined threshold count, and may select only aggregation definitions that satisfy (e.g., meet and/or exceed) the threshold count to be included in the candidate set of aggregation definitions (e.g., the candidate set of aggregation definitions only includes aggregation definitions that satisfied, at least partially, a threshold count of queries). Returning to the illustration, query processing system 102 may determine that a first aggregation definition, produced from a combination of the third query parameter, the fourth query parameter, and the second query parameter, satisfied, at least partially, the most queries of the second set of database queries, and that a second aggregation definition, produced from a combination of the third query parameter and the fourth query parameter, satisfied, at least partially, the next most queries of the second set of database queries.

In some non-limiting embodiments or aspects, query processing system 102 may generate at least one aggregated dataset based on the candidate set of aggregation definitions. Query processing system 102 may use one or more of the candidate aggregation definitions in the generation of each aggregated dataset of the one or more aggregated datasets. Query processing system 102 may supplement the candidate aggregation definitions with other query parameters in order to generate the aggregated dataset. Query processing system 102 may generate the at least one aggregated dataset in a second time period after the first time period in which the first set of database queries and/or second set of database queries were received, stored, and/or retrieved. Query processing system 102 may store the at least one aggregated dataset in database 104, in the second time period, after the at least one aggregated dataset is generated. Returning to the illustration, query processing system 102 may use the first aggregation definition to generate an aggregated dataset that includes a combination of data that satisfies the query parameters included in the combination of the first aggregation definition.

In some non-limiting embodiments or aspects, query processing system 102 may perform at least one database query using the at least one aggregated dataset. For example, query processing system 102 may receive at least one request (e.g., from computing device 106) including the at least one database query in a third time period after the second time period. Query processing system 102 may retrieve the at least one aggregated dataset from database 104 in the third time period based on the at least one request (e.g., comparing the query parameters of the at least one database query to the constituent query parameters used to generate the at least one aggregated dataset, comparing the query parameters of the at least one database query to the records, columns, and/or values of the at least one aggregated dataset to determine that the query parameters would at least partially be satisfied by the at least one aggregated dataset, etc.). Query processing system 102 may perform the at least one database query using all or some of the at least one aggregated dataset, and may or may not include additional data of a data store in database 104. In this manner, the aggregated dataset may improve the efficiency of processing real-time database queries through time savings (e.g., for not needing to aggregate, at the time of the database query, the data of the at least one aggregated dataset), and, furthermore, through computational savings (e.g., for not having to aggregate the data of the at least one aggregated dataset each and every time a query processed by query processing system 102 requires the aggregated data of the at least one aggregated dataset). After performing the at least one database query, query processing system 102 may transmit at least one response to computing device 106 that includes at least one result of the at least one database query.

In some non-limiting embodiments or aspects, query processing system 102 may regenerate the at least one aggregated dataset over a plurality of periodic intervals (e.g., days, weeks, months, etc.). Query processing system 102 may regenerate that least one aggregated dataset in each interval by performing a plurality of steps. The plurality of steps may include query processing system 102 updating the database queries stored in database 104 based on one or more database queries performed in a preceding interval. The plurality of steps may include query processing system 102 receiving at least a portion of the updated stored database queries from database 104 and parsing each query therein to produce an updated plurality of query parameters. The plurality of steps may include query processing system 102 determining an updated plurality of frequencies based on a frequency of each updated query parameter occurring in the updated set of database queries, and generating an updated plurality of aggregation definitions based on the updated plurality of query parameters and the updated plurality of frequencies. The plurality of steps may include query processing system 102 determining an updated candidate set of aggregation definitions from the updated plurality of aggregation definitions, generating at least one updated aggregated dataset based on the updated candidate set of aggregate definitions, and performing one or more database queries using the at least one updated aggregated dataset (e.g., based on requests received by query processing system 102 in the current interval). The database queries performed in a current interval by query processing system 102 may be accounted for in the regeneration of the at least one aggregated dataset in the next interval.

Figure 2:
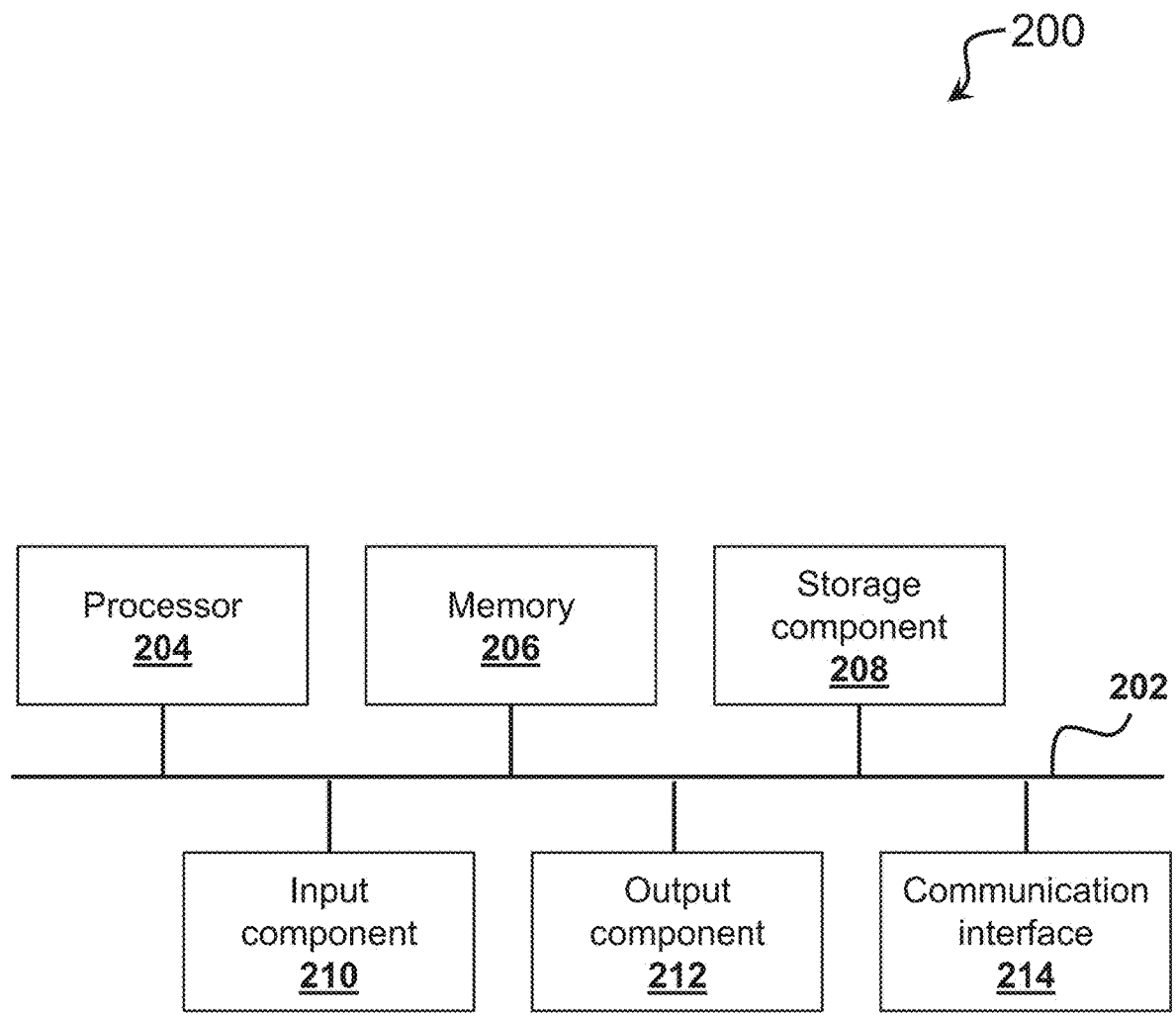
FIG. 2 is a diagram of one or more components, devices, and/or systems, according to some non-limiting embodiments or aspects.

Referring now to FIG. 2, FIG. 2 is a diagram of example components of a device 200, according to some non-limiting embodiments or aspects. Device 200 may correspond to one or more devices of query processing system 102, database 104, computing device 106, and/or communication network 108, as shown in FIG. 1. In some non-limiting embodiments or aspects, such systems or devices may include at least one device 200 and/or at least one component of device 200.

As shown in FIG. 2, device 200 may include bus 202, processor 204, memory 206, storage component 208, input component 210, output component 212, and communication interface 214. Bus 202 may include a component that permits communication among the components of device 200. In some non-limiting embodiments or aspects, processor 204 may be implemented in hardware, firmware, or a combination of hardware and software. For example, processor 204 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 206 may include random access memory (RAM), read only memory (ROM), and/or another type of dynamic or static storage device (e.g., flash memory, magnetic memory, optical memory, etc.) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, etc.) and/or another type of computer-readable medium.

Input component 210 may include a component that permits device 200 to receive information, such as via user input (e.g., a touch screen display, a keyboard, a keypad, a mouse, a button, a switch, a microphone, etc.). Additionally, or alternatively, input component 210 may include a sensor for sensing information (e.g., a global positioning system (GPS) component, an accelerometer, a gyroscope, an actuator, etc.). Output component 212 may include a component that provides output information from device 200 (e.g., a display, a speaker, one or more light-emitting diodes (LEDs), etc.).

Communication interface 214 may include a transceiver-like component (e.g., a transceiver, a separate receiver and transmitter, etc.) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally, or alternatively, hardwired circuitry may be used in place of or in combination with software instructions to perform one or more processes described herein. Thus, embodiments or aspects described herein are not limited to any specific combination of hardware circuitry and software.

The number and arrangement of components shown in FIG. 2 are provided as an example. In some non-limiting embodiments, device 200 may include additional components, fewer components, different components, or differently arranged components than those shown in FIG. 2. Additionally or alternatively, a set of components (e.g., one or more components) of device 200 may perform one or more functions described as being performed by another set of components of device 200.

Figure 3:
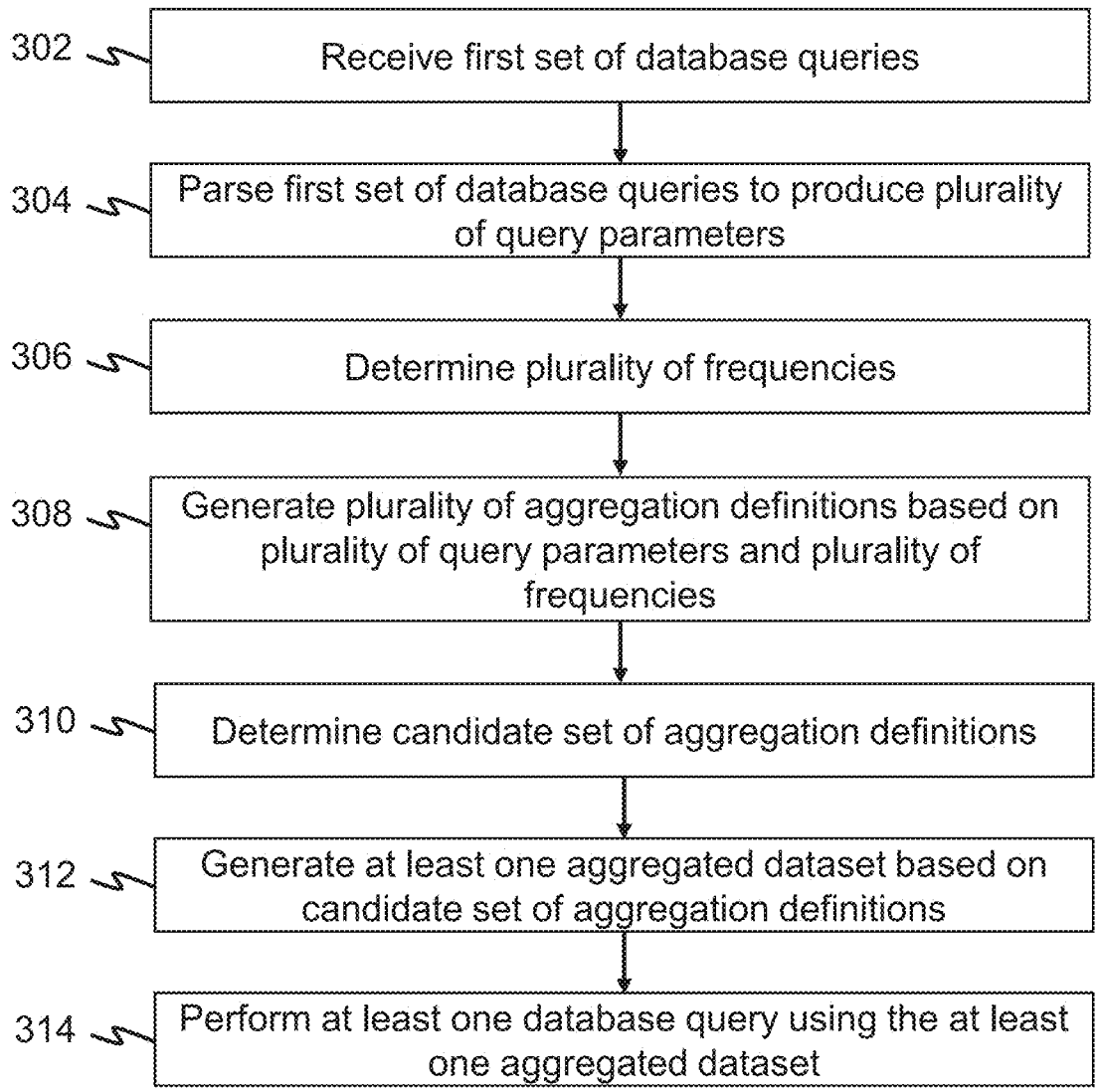
FIG. 3 is a flowchart of a method for accelerated database queries using aggregation definitions, according to some non-limiting embodiments or aspects.

Referring now to FIG. 3, FIG. 3 is a flowchart of a non-limiting embodiment or aspect of a process 300 for accelerated database queries using aggregation definitions, according to some non-limiting embodiments or aspects. The steps shown in FIG. 3 are for example purposes only. It will be appreciated that additional, fewer, different, and/or a different order of steps may be used in non-limiting embodiments or aspects. In some non-limiting embodiments or aspects, one or more of the steps of process 300 may be performed (e.g., completely, partially, and/or the like) by query processing system 102. In some non-limiting embodiments or aspects, one or more of the steps of process 300 may be performed (e.g., completely, partially, and/or the like) by another system, another device, another group of systems, or another group of devices, separate from or including query processing system 102.

As shown in FIG. 3, at step 302, process 300 may include receiving a first set of database queries. For example, query processing system 102 may receive a first set of database queries, wherein each query includes one or more query parameters. Each query parameter may include at least one of: a selection of a column, a grouping of two or more columns, a predicate column, an expression, or any combination thereof. In some non-limiting embodiments or aspects, when receiving the first set of database queries, query processing system 102 may retrieve at least a portion of stored database queries from a first data store of database 104, wherein at least a portion of the stored database queries includes the first set of database queries. In some non-limiting embodiments or aspects, at least a portion of the first set of database queries may be included in one or more requests transmitted to query processing system 102 by one or more computing devices 106.

As shown in FIG. 3, at step 304, process 300 may include parsing the first set of database queries to produce a plurality of query parameters. For example, query processing system 102 may parse each query of the first set of database queries to produce a plurality of query parameters. The plurality of query parameters may include two or more of the same (or substantially the same) query parameters.

As shown in FIG. 3, at step 306, process 300 may include determining a plurality of frequencies. For example, query processing system 102 may determine a plurality of frequencies based on a frequency of each query parameter of the plurality of query parameters occurring in the first set of database queries. In some non-limiting embodiments or aspects, query processing system 102 may perform a counting process of unique occurrences of query parameters to determine a frequency (e.g., total count) of each unique query parameter appearing in the plurality of query parameters of the first set of database queries.

As shown in FIG. 3, at step 308, process 300 may include generating a plurality of aggregation definitions based on the plurality of query parameters and the plurality of frequencies. For example, query processing system 102 may generate a plurality of aggregation definitions based on the plurality of query parameters and the plurality of frequencies. In some non-limiting embodiments or aspects, when generating the plurality of aggregation definitions, query processing system 102 may determine a set of query parameters of the plurality of query parameters that have the highest frequencies in the plurality of frequencies, and may further generate each aggregation definition using a combination of query parameters from the set of query parameters that have the highest frequencies. By way of further example, query processing system 102 may rank, in order of frequency, the plurality of query parameters and select at least a portion of the plurality of query parameters having the highest frequencies.

As shown in FIG. 3, at step 310, process 300 may include determining a candidate set of aggregation definitions. For example, query processing system 102 may determine a candidate set of aggregation definitions from the plurality of aggregation definitions, based on a number of queries of a second set of database queries that would be at least partially satisfied by each aggregation definition of the plurality of aggregation definitions. In some non-limiting embodiments or aspects, the candidate set of aggregation definitions may include one or more aggregation definitions that satisfied, at least partially, the most database queries of the second set of database queries. In some non-limiting embodiments or aspects, the first set of database queries may include the second set of database queries.

As shown in FIG. 3, at step 312, process 300 may include generating at least one aggregated dataset based on the candidate set of aggregation definitions. For example, query processing system 102 may generate the at least one aggregated dataset based on the candidate set of aggregation definitions. In some non-limiting embodiments or aspects, when generating the at least one aggregated dataset, query processing system 102 may generate the at least one aggregated dataset in a time period after a time period in which database queries were performed, stored, and used, at least partly, as the first set of database queries in step 302. By way of further example, process 400 of FIG. 4 may occur in a first time period that precedes a second time period that includes step 312 of process 300 of FIG. 3. In some non-limiting embodiments or aspects, when generating the at least one aggregated dataset, query processing system 102 may store that least one aggregated dataset in a second data store of database 104 in the second time period. The second data store may include the first data store.

As shown in FIG. 3, at step 314, process 300 may include performing at least one database query using the at least one aggregated dataset. For example, query processing system 102 may perform at least one database query using the at least one aggregated dataset. In some non-limiting embodiments or aspects, when performing the at least one database query, query processing system 102 may receive at least one request (e.g., from computing device 106) including the at least one database query, in a third time period after the second time period. In some non-limiting embodiments or aspects, when performing the at least one database query, query processing system 102 may retrieve the at least one aggregated dataset from the second data store in the third time period based on the at least one request (e.g., by comparing at least a portion of the request, the at least one database query, and/or the query parameters thereof to the at least one aggregated dataset, aggregation definitions thereof, and/or query parameters thereof, to identify at least one matching query parameter). In some non-limiting embodiments or aspects, query processing system 102 may perform the at least one database query in the third time period using the at least one aggregated dataset.

In some non-limiting embodiments or aspects, e.g., when the at least one database query was included in at least one request received from at least one computing device 106, process 300 may include, after performing the at least one database query at step 314, transmitting at least one response to at least one computing device 106. For example, query processing system 102 may transmit at least one response (e.g., a message) including at least one result of the at least one database query to at least one computing device 106. The receipt of a response at computing device 106 may cause computing device 106 to display at least a portion of the at least one result in a user interface of computing device 106.

In some non-limiting embodiments or aspects, step 302 through step 314 of process 300 may be performed in an iterative (e.g., cyclical, periodic) fashion from one time interval to the next. Process 300 may include, at repeated steps 302 through step 314, regenerating the at least one aggregated dataset over a plurality of periodic intervals (e.g., days, weeks, months, etc.). For example, query processing system 102 may regenerate the at least one aggregated dataset over a plurality of periodic intervals including a series of repeated steps during each interval. In each interval, query processing system 102 may update the stored database queries in the first data store based on one or more database queries performed (at step 314) in a preceding interval of the plurality of periodic intervals to produce updated stored database queries. In each interval, query processing system 102 may also receive (at step 302) at least a portion of the updated stored database queries including an updated set of database queries. In each interval, query processing system 102 may further parse (at step 304) each query of the updated set of database queries to produce an updated plurality of query parameters.

In each interval, query processing system 102 may further determine (at step 306) an updated plurality of frequencies based on a frequency of each query parameter of the updated plurality of query parameters occurring in the updated set of database queries. In each interval, query processing system 102 may further generate (at step 308) an updated plurality of aggregation definitions based on the updated plurality of query parameters and the updated plurality of frequencies. In each interval, query processing system 102 may further determine (at step 310) an updated candidate set of aggregation definitions from the updated plurality of aggregation definitions. In each interval, query processing system 102 may further generate (at step 312) at least one updated aggregated dataset based on the updated candidate set of aggregation definitions. In each interval, query processing system 102 may further perform (at step 314) one or more database queries using the at least one updated aggregated dataset. The one or more database queries processed by query processing system 102 in a given time interval may then be used to update the stored dataset queries for a next interval of the iterative process for regenerating the at least one aggregated dataset over a plurality of periodic intervals.

Figure 4:
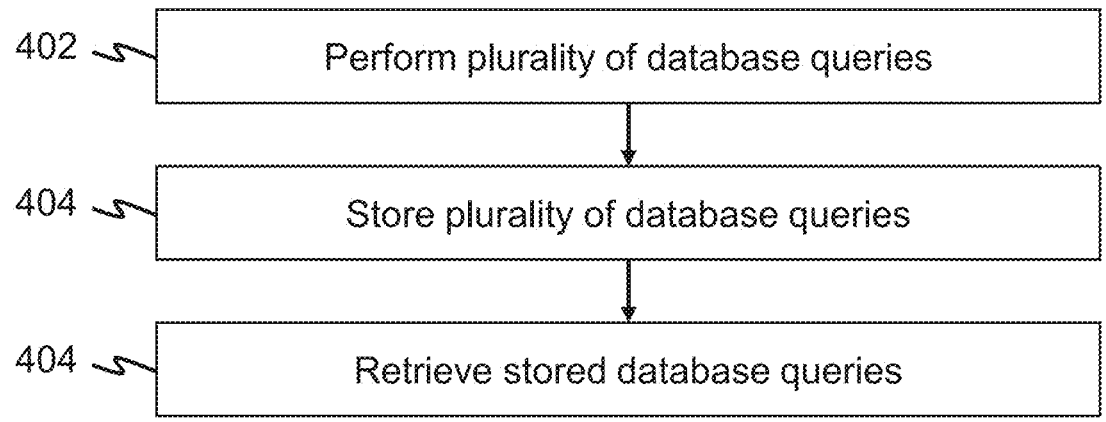
FIG. 4 is a flowchart of a method for accelerated database queries using aggregation definitions, according to some non-limiting embodiments or aspects.

Referring now to FIG. 4, FIG. 4 is a flowchart of a non-limiting embodiment or aspect of a process 400 for accelerated database queries using aggregation definitions, according to some non-limiting embodiments or aspects. In particular, process 400 illustrates exemplary steps related to receiving a set of database queries for each time period that the at least one aggregated dataset is generated (or regenerated). The steps shown in FIG. 4 are for example purposes only. It will be appreciated that additional, fewer, different, and/or a different order of steps may be used in non-limiting embodiments or aspects. In some non-limiting embodiments or aspects, one or more of the steps of process 400 may be performed (e.g., completely, partially, and/or the like) by query processing system 102. In some non-limiting embodiments or aspects, one or more of the steps of process 400 may be performed (e.g., completely, partially, and/or the like) by another system, another device, another group of systems, or another group of devices, separate from or including query processing system 102.

As shown in FIG. 4, at step 402, process 400 includes performing a plurality of database queries. For example, query processing system 102 may perform a plurality of database queries in a first time period. The plurality of database queries may be included in a plurality of requests from one or more computing devices 106 to query processing system 102. In some non-limiting embodiments or aspects, at least some database queries processed in one time period may be used in a next time period as a first set of database queries (e.g., received in step 302 of process 300 in FIG. 3), from which to generate at least one aggregated dataset.

As shown in FIG. 4, at step 404, process 400 includes storing the plurality of database queries. For example, query processing system 102 may store at least a portion of the plurality of database queries in a first data store of database 104 in the first time period to produce stored database queries. In some non-limiting embodiments or aspects, at least a portion of database queries that are processed by query processing system 102 on an ongoing basis may be stored in the first data store and persisted until at least one future time period for use as a first set of database queries (e.g., received in step 302 of process 300 in FIG. 3).

As shown in FIG. 4, at step 406, process 400 may include retrieving the stored database queries. For example, query processing system 102 may retrieve at least a portion of the stored database queries from the first data store of database 104, wherein the at least a portion of the stored database queries includes the first set of database queries (e.g., received in step 302 of process 300 in FIG. 3). Step 406 of process 400 in FIG. 4 may be included in step 302 of process 300 in FIG. 3.

Figure 5:
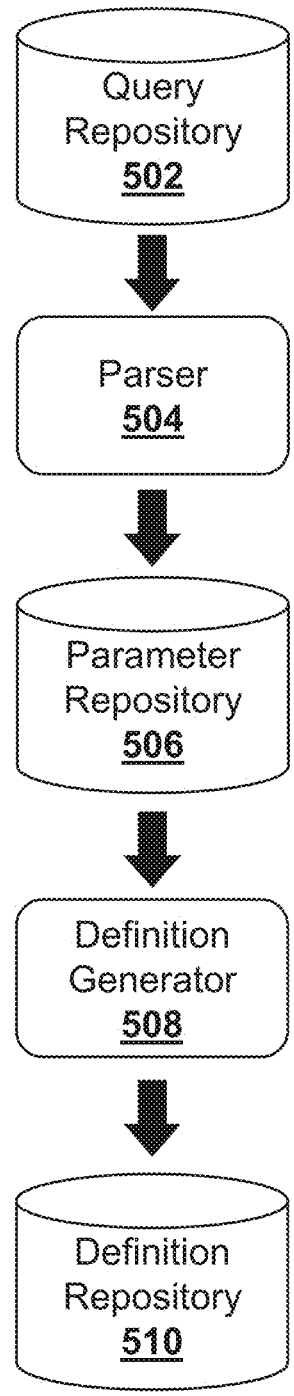
FIG. 5 is a schematic diagram of a system for accelerated database queries using aggregation definitions, according to some non-limiting embodiments or aspects.

Referring now to FIG. 5, FIG. 5 is a schematic diagram of a non-limiting embodiment or aspect of a system 500 for accelerated database queries using aggregation definitions, according to some non-limiting embodiments or aspects. In particular, FIG. 5 illustrates a system 500 for generating a plurality of aggregation definitions for use in determining a candidate set of aggregation definitions (e.g., in system 600 depicted in FIG. 6). It will be appreciated that additional, fewer, different, and/or a different order of components of system 500 may be used in non-limiting embodiments or aspects. In some non-limiting embodiments or aspects, one or more of the components of system 500 may be included in query processing system 102 and/or database 104. In some non-limiting embodiments or aspects, one or more of the components of system 500 may be included in another system, another device, another group of systems, or another group of devices, separate from or including query processing system 102 and/or database 104. System 500 of FIG. 5 may be included in a same system as system 600 of FIG. 6, including query processing system 102.

As shown in FIG. 5, system 500 may include a query repository 502. For example, database 104 may include one or more data stores including query repository 502. Query processing system 102 may perform a plurality of database queries in a first time period and store at least a portion of the plurality of database queries in query repository 502 to produce stored database queries in the first time period. Thereafter, query processing system 102 may receive a first set of database queries from query repository 502.

As shown in FIG. 5, system 500 may include a parser 504. For example, query processing system 102 may include parser 504. Query processing system 102 may parse, using parser 504, each query of the first set of database queries to produce a plurality of query parameters.

As shown in FIG. 5, system 500 may include a parameter repository 506. For example, database 104 may include one or more data stores including parameter repository 506. Query processing system 102 may store the plurality of query parameters produced by parser 504 in parameter repository 506.

As shown in FIG. 5, system 500 may include a definition generator 508. For example, query processing system 102 may include definition generator 508. Query processing system 102 may generate, using definition generator 508, a plurality of aggregation definitions based on the plurality of query parameters and the plurality of frequencies. In some non-limiting embodiments or aspects, query processing system 102 may determine, using definition generator 508, a set of query parameters of the plurality of query parameters that have the highest frequencies in the plurality of frequencies. Query processing system 102 may further generate, using definition generator 508, each aggregation definition of the plurality of aggregation definitions using a combination of query parameters from the set of query parameters that have the highest frequencies.

As shown in FIG. 5, system 500 may include a definition repository 510. For example, database 104 may include one or more data stores including definition repository 510. Query processing system 102 may store the plurality of aggregation definitions in definition repository 510 for use in determining a candidate set of aggregation definitions.

Figure 6:
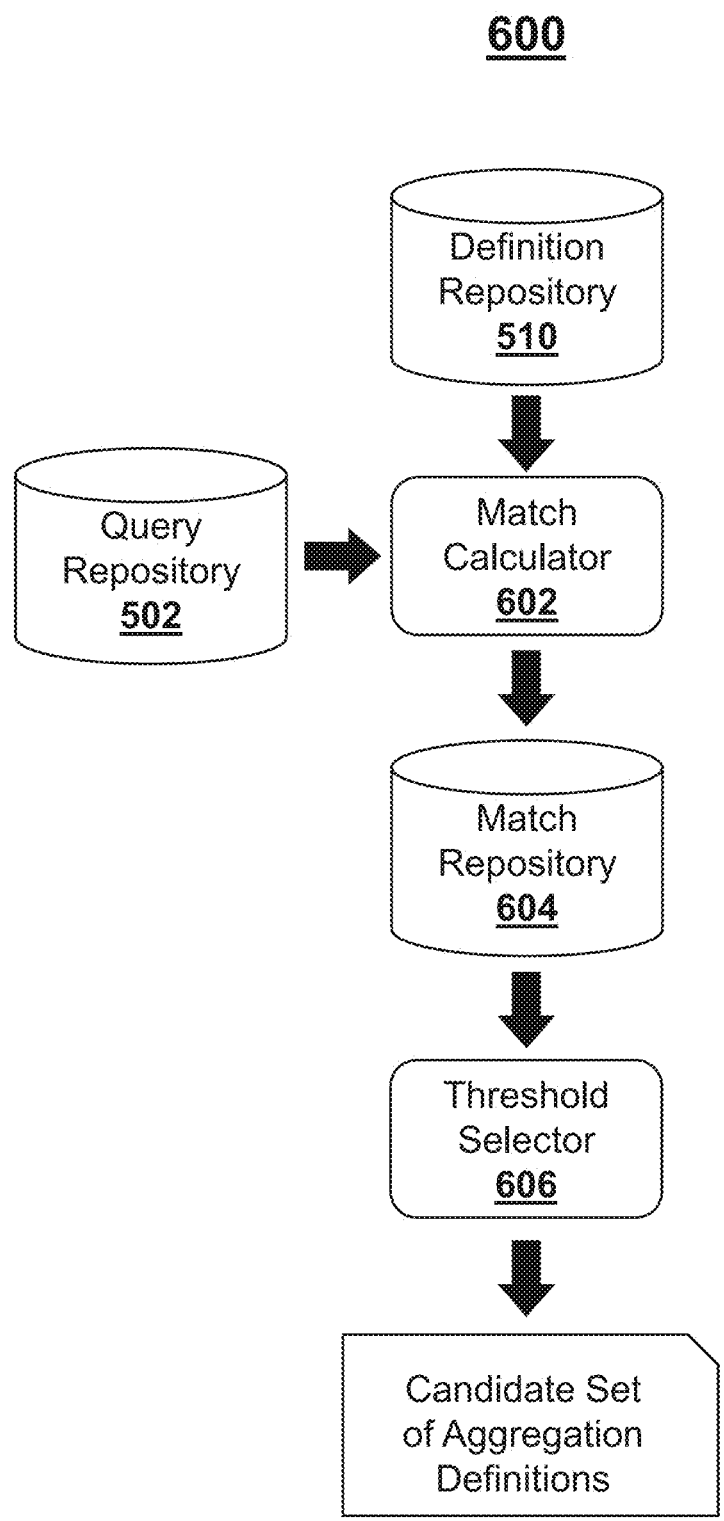
FIG. 6 is a schematic diagram of a system for accelerated database queries using aggregation definitions, according to some non-limiting embodiments or aspects.

Referring now to FIG. 6, FIG. 6 is a schematic diagram of a non-limiting embodiment or aspect of a system 600 for accelerated database queries using aggregation definitions, according to some non-limiting embodiments or aspects. In particular, FIG. 6 illustrates a system 600 for determining a candidate set of aggregation definitions from a generated plurality of aggregation definitions (e.g., in system 500 depicted in FIG. 5). It will be appreciated that additional, fewer, different, and/or a different order of components of system 600 may be used in non-limiting embodiments or aspects. In some non-limiting embodiments or aspects, one or more of the components of system 600 may be included in query processing system 102 and/or database 104. In some non-limiting embodiments or aspects, one or more of the components of system 600 may be included in another system, another device, another group of systems, or another group of devices, separate from or including query processing system 102 and/or database 104. System 600 of FIG. 6 may be included in a same system as system 500 of FIG. 5, including query processing system 102.

As shown in FIG. 6, system 600 may include definition repository 510, query repository 502, and a match calculator 602. For example, query processing system 102 may include match calculator 602. Query processing system 102 may calculate, based on a second set of database queries received from query repository 502 and the plurality of aggregation definitions received from definition repository 510, how many database queries of the second set of database queries would be satisfied, at least partially, by each aggregation definition of the plurality of aggregation definitions. Match calculator 602 may output at least a count of database queries at least partially satisfied for each aggregation definition.

As shown in FIG. 6, system 600 may include a match repository 604. For example, database 104 may include one or more data stores including match repository 604. Query processing system 102 may store the output of match calculator 602 (e.g., a count of database queries at least partially satisfied for each aggregation definition) in match repository 604 for the plurality of aggregation definitions.

As shown in FIG. 6, system 600 may include a threshold selector 606. For example, query processing system 102 may include threshold selector 606. Query processing system 102 may determine, using threshold selector 606, a candidate set of aggregation definitions from the plurality of aggregation definitions based on a number of queries of the second set of database queries that would be at least partially satisfied by each aggregation definition of the plurality of aggregation definitions. In some non-limiting embodiments or aspects, query processing system 102 may compare, using threshold selector 606, the count of satisfied database queries for each aggregation definition to a predetermined threshold and, if the count of an aggregation definition satisfies the threshold, the aggregation definition may be added to the candidate set of aggregation definitions by threshold selector 606. In this manner, system 600 may produce the candidate set of aggregation definitions, which may be used to generate the at least one aggregated dataset using some or all of the candidate set of aggregation definitions.

Although the disclosure has been described in detail for the purpose of illustration based on what is currently considered to be the most practical and preferred embodiments or aspects, it is to be understood that such detail is solely for that purpose and that the disclosure is not limited to the disclosed embodiments or aspects, but, on the contrary, is intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect, and one or more steps may be taken in a different order than presented in the present disclosure.

What is claimed is:

1. A system comprising:
at least one processor configured to:
receive a first set of database queries;
parse each query of the first set of database queries to produce a plurality of query parameters based on one or more columns of data in at least one database;
determine a plurality of frequencies based on a count of a number of times each query parameter of the plurality of query parameters occurs in the first set of database queries;
generate a plurality of aggregation definitions using a combination of query parameters from the plurality of query parameters that have highest frequencies in the plurality of frequencies, wherein each aggregation definition of the plurality of aggregation definitions comprises a combination of query parameters that combine data of one or more data tables;
determine a candidate set of aggregation definitions from the plurality of aggregation definitions that at least partially satisfy a highest number of queries of a second set of database queries;
generate at least one aggregated dataset based on the candidate set of aggregation definitions; and
perform at least one database query using the at least one aggregated dataset.

2. The system of claim 1, wherein the first set of database queries comprises the second set of database queries.

3. The system of claim 1, wherein at least one query parameter of the plurality of query parameters comprises at least one of: a selection of a column, a grouping of two or more columns, a predicate column, an expression, or any combination thereof.

4. The system of claim 1, wherein the at least one processor is further configured to:
  perform a plurality of database queries in a first time period; and
  store at least a portion of the plurality of database queries in a first data store in the first time period to produce stored database queries; and
  wherein, when receiving the first set of database queries, the at least one processor is programmed or configured to:
    retrieve at least a portion of the stored database queries from the first data store, wherein the at least a portion of the stored database queries comprises the first set of database queries.

5. The system of claim 4, wherein, when generating the at least one aggregated dataset, the at least one processor is configured to:
  generate the at least one aggregated dataset in a second time period after the first time period; and
  store the at least one aggregated dataset in a second data store in the second time period; and
  wherein, when performing the at least one database query using the at least one aggregated dataset, the at least one processor is configured to:
    receive at least one request comprising the at least one database query in a third time period after the second time period;
    retrieve the at least one aggregated dataset from the second data store in the third time period based on the at least one request; and
    perform the at least one database query in the third time period using the at least one aggregated dataset.

6. The system of claim 5, wherein, when receiving the at least one request comprising the at least one database query, the at least one processor is configured to:
  receive the at least one request from at least one computing device of at least one user; and
  wherein the at least one processor is further configured to:
    transmit at least one response to the at least one computing device comprising at least one result of the at least one database query.

7. The system of claim 6, wherein the at least one processor is further configured to, in each interval of a plurality of periodic intervals:
  update the stored database queries in the first data store based on one or more database queries performed in a preceding interval of the plurality of periodic intervals, to produce updated stored database queries;
  receive at least a portion of the updated stored database queries comprising an updated set of database queries;
  parse each query of the updated set of database queries to produce an updated plurality of query parameters;
  determine an updated plurality of frequencies based on a count of a number of times each query parameter of the updated plurality of query parameters occurs in the updated set of database queries;
  generate an updated plurality of aggregation definitions using a combination of query parameters from the updated plurality of query parameters that have highest frequencies in the updated plurality of frequencies;
  determine an updated candidate set of aggregation definitions from the updated plurality of aggregation definitions;
  generate at least one updated aggregated dataset based on the updated candidate set of aggregation definitions; and
  perform one or more database queries using the at least one updated aggregated dataset.

8. A computer-implemented method comprising:
  receiving, with at least one processor, a first set of database queries;
  parsing, with at least one processor, each query of the first set of database queries to produce a plurality of query parameters based on one or more columns of data in at least one database;
  determining, with at least one processor, a plurality of frequencies based on a count of a number of times each query parameter of the plurality of query parameters occurs in the first set of database queries;
  generating, with at least one processor, a plurality of aggregation definitions using a combination of query parameters from the plurality of query parameters that have highest frequencies in the plurality of frequencies, wherein each aggregation definition of the plurality of aggregation definitions comprises a combination of query parameters that combine data of one or more data tables;
  determining, with at least one processor, a candidate set of aggregation definitions from the plurality of aggregation definitions that at least partially satisfy a highest number of queries of a second set of database queries;
  generating, with at least one processor, at least one aggregated dataset based on the candidate set of aggregation definitions; and
  performing, with at least one processor, at least one database query using the at least one aggregated dataset.

9. The computer-implemented method of claim 8, wherein the first set of database queries comprises the second set of database queries.

10. The computer-implemented method of claim 8, wherein at least one query parameter of the plurality of query parameters comprises at least one of: a selection of a column, a grouping of two or more columns, a predicate column, an expression, or any combination thereof.

11. The computer-implemented method of claim 8, further comprising:
  performing, with at least one processor, a plurality of database queries in a first time period; and
  storing, with at least one processor, at least a portion of the plurality of database queries in a first data store in the first time period to produce stored database queries;
  wherein receiving the first set of database queries comprises:
    retrieving at least a portion of the stored database queries from the first data store, wherein the at least a portion of the stored database queries comprises the first set of database queries.

12. The computer-implemented method of claim 11, wherein generating the at least one aggregated dataset comprises:
  generating the at least one aggregated dataset in a second time period after the first time period; and
  storing the at least one aggregated dataset in a second data store in the second time period; and
  wherein performing the at least one database query using the at least one aggregated dataset comprises:
    receiving at least one request comprising the at least one database query in a third time period after the second time period;
    retrieving the at least one aggregated dataset from the second data store in the third time period based on the at least one request; and performing the at least one database query in the third time period using the at least one aggregated dataset.

13. The computer-implemented method of claim 12, wherein receiving the at least one request comprising the at least one database query comprises:
receiving the at least one request from at least one computing device of at least one user;
the method further comprising:
transmitting, with at least one processor, at least one response to the at least one computing device comprising at least one result of the at least one database query.

14. The computer-implemented method of claim 13, further comprising, in each interval of a plurality of periodic intervals:
updating, with at least one processor, the stored database queries in the first data store based on one or more database queries performed in a preceding interval of the plurality of periodic intervals, to produce updated stored database queries;
receiving, with at least one processor, at least a portion of the updated stored database queries comprising an updated set of database queries;
parsing, with at least one processor, each query of the updated set of database queries to produce an updated plurality of query parameters;
determining, with at least one processor, an updated plurality of frequencies based on a count of a number of times each query parameter of the updated plurality of query parameters occurs in the updated set of database queries;
generating, with at least one processor, an updated plurality of aggregation definitions using a combination of query parameters from the updated plurality of query parameters that have highest frequencies in the updated plurality of frequencies;
determining, with at least one processor, an updated candidate set of aggregation definitions from the updated plurality of aggregation definitions;
generating, with at least one processor, at least one updated aggregated dataset based on the updated candidate set of aggregation definitions; and
performing, with at least one processor, one or more database queries using the at least one updated aggregated dataset.

15. A computer program product comprising at least one non-transitory computer-readable medium comprising program instructions that, when executed by at least one processor, cause the at least one processor to:
receive a first set of database queries;
parse each query of the first set of database queries to produce a plurality of query parameters based on one or more columns of data in at least one database;
determine a plurality of frequencies based on a count of a number of times each query parameter of the plurality of query parameters occurs in the first set of database queries;
generate a plurality of aggregation definitions using a combination of query parameters from the plurality of query parameters that have highest frequencies in the plurality of frequencies, wherein each aggregation definition of the plurality of aggregation definitions comprises a combination of query parameters that combine data of one or more data tables;
determine a candidate set of aggregation definitions from the plurality of aggregation definitions that at least partially satisfy a highest number of queries of a second set of database queries;
generate at least one aggregated dataset based on the candidate set of aggregation definitions; and
perform at least one database query using the at least one aggregated dataset.

16. The computer program product of claim 15, wherein at least one query parameter of the plurality of query parameters comprises at least one of: a selection of a column, a grouping of two or more columns, a predicate column, an expression, or any combination thereof.

17. The computer program product of claim 15, wherein the program instructions further cause the at least one processor to:
perform a plurality of database queries in a first time period; and
store at least a portion of the plurality of database queries in a first data store in the first time period to produce stored database queries; and
wherein the program instructions that cause the at least one processor to receive the first set of database queries cause the at least one processor to:
retrieve at least a portion of the stored database queries from the first data store, wherein the at least a portion of the stored database queries comprises the first set of database queries.

18. The computer program product of claim 17, wherein the program instructions that cause the at least one processor to generate the at least one aggregated dataset cause the at least one processor to:
generate the at least one aggregated dataset in a second time period after the first time period; and
store the at least one aggregated dataset in a second data store in the second time period; and
wherein the program instructions that cause the at least one processor to perform the at least one database query using the at least one aggregated dataset cause the at least one processor to:
receive at least one request comprising the at least one database query in a third time period after the second time period;
retrieve the at least one aggregated dataset from the second data store in the third time period based on the at least one request; and
perform the at least one database query in the third time period using the at least one aggregated dataset.

19. The computer program product of claim 18, wherein the program instructions that cause the at least one processor to receive the at least one request comprising the at least one database query cause the at least one processor to:
receive the at least one request from at least one computing device of at least one user; and
wherein the program instructions further cause the at least one processor to:
transmit at least one response to the at least one computing device comprising at least one result of the at least one database query.

20. The computer program product of claim 19, wherein the program instructions further cause the at least one processor to, in each interval of a plurality of periodic intervals:
update the stored database queries in the first data store based on one or more database queries performed in a preceding interval of the plurality of periodic intervals, to produce updated stored database queries;

receive at least a portion of the updated stored database queries comprising an updated set of database queries;

parse each query of the updated set of database queries to produce an updated plurality of query parameters;

determine an updated plurality of frequencies based on a count of a number of times each query parameter of the updated plurality of query parameters occurs in the updated set of database queries;

generate an updated plurality of aggregation definitions using a combination of query parameters from the updated plurality of query parameters that have highest frequencies in the updated plurality of frequencies;

determine an updated candidate set of aggregation definitions from the updated plurality of aggregation definitions;

generate at least one updated aggregated dataset based on the updated candidate set of aggregation definitions; and perform one or more database queries using the at least one updated aggregated dataset.

* * * * *